United States Patent
Pauliukonis

[11] 3,913,620
[45] Oct. 21, 1975

[54] MOMENTARY CONTACT VALVE

[76] Inventor: Richard S. Pauliukonis, 6660 Greenbriar Drive, Cleveland, Ohio 44130

[22] Filed: May 24, 1974

[21] Appl. No.: 473,186

Related U.S. Application Data

[63] Continuation-in-part of Ser. No. 312,888, April 4, 1972.

[52] U.S. Cl. ...... 137/625.64; 251/333; 137/625.27; 137/625.67
[51] Int. Cl.² ................. F16K 11/06; F16K 31/122
[58] Field of Search ....... 137/625.5, 625.64, 625.27, 137/596.16, 625.67; 251/333

[56] References Cited
UNITED STATES PATENTS

| | | | |
|---|---|---|---|
| 3,283,784 | 11/1966 | Ruchser | 137/625.64 |
| 3,318,332 | 5/1967 | Lansky et al. | 137/625.64 |

*Primary Examiner*—Arnold Rosenthal

[57] ABSTRACT

An internally piloted two position springless momentary contact valve, having two oppositely mounted electrical solenoid operators at each valve housing end, with conical valve seats adjacent each valve housing end interconnected by a bore passing therethrough and a pilot ported stem with tapered plug cones at each opposite stem end, including at least three perpendicular ports for fluid communication with said bore, and is adaptable to serve as a directional three or four way valve, operated by the fluid pressure acting on tapered surface of the plug at one valve end to hold at the opposite valve end the other tapered plug cone engaged inside conical valve seat blocking fluid communication from inlet port to one of fluid receiver ports until the solenoid becomes energized to open pilot port in stem and to allow fluid pressure action over the face of the plug cone opposite to tapered surface for stem shifting from a first closed position blocking fluid communication from inlet port to a first fluid receiver port while feeding second fluid receiver port to a second open position allowing fluid communication from inlet port to a first fluid receiver port while blocking second fluid receiver port, and so constructed that the relative area of both the tapered surface and the face of each plug cone outbalance each other in both positions of the valve eliminating the need for biasing spring on the valve stem except for the operator springs which maintain the solenoid plungers over the stem pilot port rendering internal pilot normally closed.

4 Claims, 4 Drawing Figures

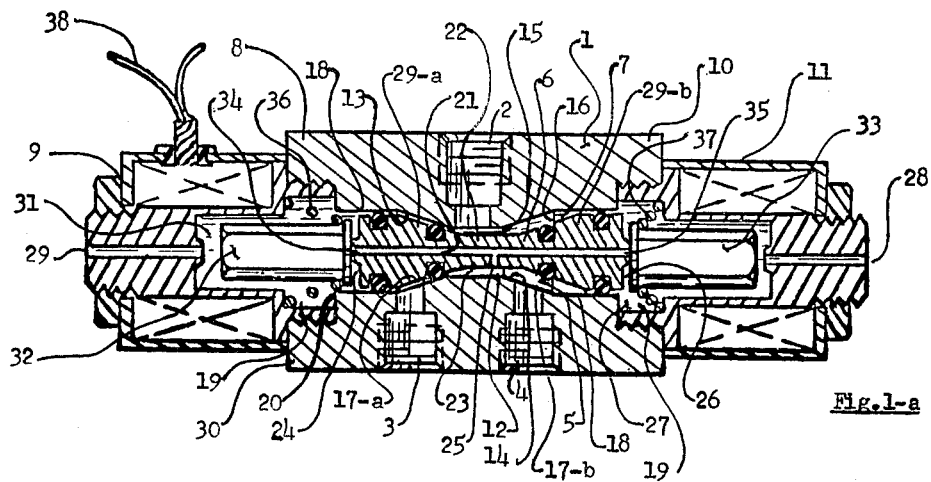
Fig. 1-a
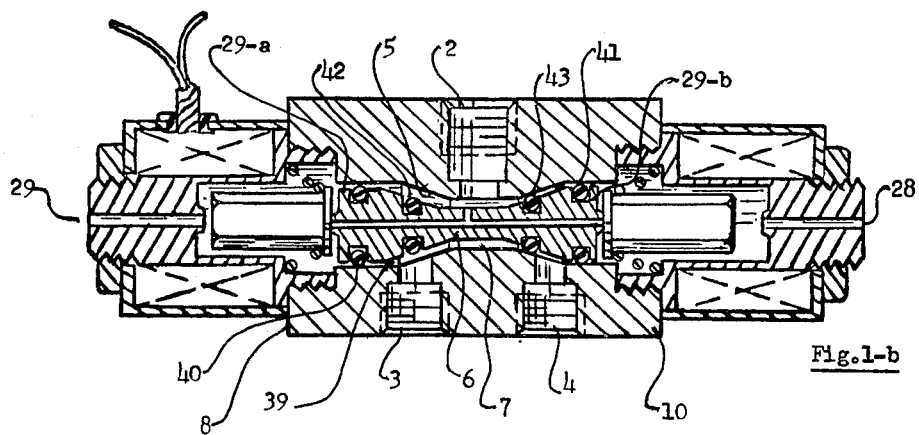
Fig. 1-b
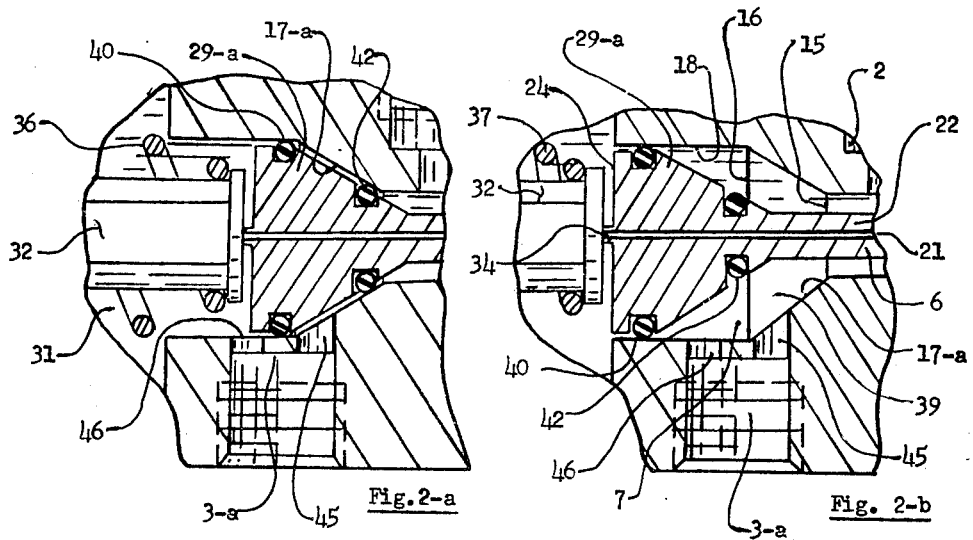
Fig. 2-a    Fig. 2-b

MOMENTARY CONTACT VALVE

This is a continuation in part of my copending application on tapered valves with conical seats, Ser. No. 312,888 filed Apr. 4, 1972.

The improvements offered by the basic principle conical valves with tapered seats entail are quite universal and applicable to many directional valves as well. In one application such principle was used to provide radically new check-relief valve, in another application the same principle has served well when incorporated into a safety relief valve. Many two way valves with self-holding and self-relieving tapers could be constructed to provide superior performance by the use of this basic principle with savings in space and materials, and in turn, in costs of producing such superior valves.

It is obviously desirable to provide valves of this general type which are relatively simple and inexpensive.

The present invention will consider the same basic principle as described in the above copending application where applicable, and will show changes that make this valve design unique by further simplification of the solenoid operated valves.

These and other objects and advantages of the invention will become more fully apparent from the following description of the embodiment of the invention, taken together with the accompanying drawings:

IN THE DRAWINGS

FIG. 1-a is a cross-sectional view of a three way momentary contact valve showing first closed position blocking fluid communication from inlet port to a first fluid receiver port while feeding second fluid receiver port, with single holes in ports.

FIG. 1-b is a cross-sectional view of a valve shown in FIG. 1-a with position change allowing fluid communication from inlet port to a first fluid receiver port while blocking second receiver port, with single holes in ports.

FIG. 2-a is a cut out of the valve shown in FIG. 1-a identifying simple means of converting it to a four way valve by double drilled fluid receiver port to provide separate exhaust hole for receiver while blocking supply hole when stem plug is in position identified therein, which is identical to the position shown in FIG. 1-a.

FIG. 2-b is the same cut-out as shown in FIG. 2-a with position change of the plug cone allowing fluid communication from inlet port to a first receiver port through double drilled holes, identical to the position shown in FIG. 1-b.

It should be understood that the valves according to the present invention are particularly suitable for miniaturization, i.e. valves are designed to be constructed as miniature valves, a term known in the fluid power art, but not limited to it. It is so because when two of the three way valves are hooked up side by side in a power cylinder they can perform a double acting function and operate exactly as a single four way valve would. Such a combination of two separate 3-way valves into a single four way valve would indeed increase the capacity of such valves and in turn exceed the miniature valve classification. In fact the basic valve as shown in FIG. 1-a is contemplated to serve as miniature 4-way valve only when provided with double drilled holes in fluid receiver ports, as shown in FIG. 2-a. otherwise the basic valve of FIG. 1-a can handle larger flows than those miniature valves provide and as such being miniature in envelope can be classified large in capacity, and can serve as a diverter three way valve or even as a large capacity four way valve (not shown) when two stems become assembled into one envelope and the second stem of identical configuration serves as a slave to facilitate large capacity valve exhaust for such momentary contact four way valves of this invention.

Refering to the drawings and particularly FIGS. 1-a and 1-b, and internally piloted two position springless momentary contact valve 1 with a housing 30 is adapted to control a directional flow of pressurized fluid from a source entering inlet port 2 to feed a first receiver port 3 which in FIG. 1-a is shown blocked and also to feed a second receiver port 4 which in FIG. 1-a is shown in communication with inlet port 2 via annular space 5 formed between a shiftable stem 6 and an elongated housing bore 7 extending therethrough from one housing end 8 provided with an electrically actuated solenoid operator 9 to another housing end 10 provided with oppositely mounted another solenoid operator 11. Housing bore 7 is shown to have a reduced diameter central section 12 having a perpendicularly situated side port 2 in direct communication therewith and extending uniformly toward each housing end of by two identical opposing and outwardly passing conical valve bore sections 13 and 14 which taper from smaller diameters 15 comprising the innermost end of central bore section 12 to larger diameters 16 forming a taper angle therebetween to provide tapered or conical valve seats 17-a and 17-b of identical angle, aand continuing thereafter outwardly with straight bore sections 18 of identical diameters 16 to exit with open end receivers 19 through shoulders 20 formed between bore sections 18 and receivers 19 at each housing end. Ports 3 and 4 enter housing side wall adjacent to and through larger diameters 16 of conical valve seats 17-a and-b for fluid communication with housing bore 7. Although FIGS. 1-a and 1-b show diameters 15 and 16 of valve seals 17-a and-b, FIG. 2-b identifies these diameters more clearly, including straight bore section 18 inside housing bore 7, all comprising a part thereof and adaptable to receive tapered plug cone 29-a of stem 6 shown therein with a pilot port 21 covered by plunger 32 of solenoid 9.

Stem 6 with identical valve members at each end has a central section 22 of a diameter considerably smaller than the central bore section 12 providing an annular space 23 therebetween for fluid flow from the inlet port 2 to one of the receiver ports 3 and 4 depending on the position of the stem inside bore 7, which in the illustrated case of FIG. 1-a is shown to have port 4 in direct communication with port 2 via annuluses 5 and 23 because of a plug cone 29-b having dimensional configuration and taper angle identical to that of the conical valve seat 17-b unseated a distance away therefrom while the opposite plug cone 29-a also of identical dimensional configuration and taper angle to that of its mating conical valve seat 17-a is seated and maintained therein by the fluid pressure action over conical surface of opposing plug cone 29-b, blocking fluid communication between ports 2 and 3 for as long as the position of stem 6 does not change from that shown in FIG. 1-a. Pilot port 21 extending internally and through the stem entire length initiates with aperture 25 substantially midway of the stem section 22 for constant communication with pressurized fluid supply entering via port 2 irrespective of the position stem 6 assumes inside housing bore 7, to supply pressurized fluid to an end face 24 of plug cone 29-*a* and an end face 26 of cone 29-*b* for stem position change when desired from that shown in FIG. 1-*a* to that shown in FIG. 1-*b*.

The position of stem 6 of FIG. 1-*a* is generally fixed and maintained by the pressure action over the conical surface of plug cone 29-*b* automatically, and the plug cone end 26 facing a solenoid cavity 27 is atmospheric as the solenoid-operator-exhaust passages are open thereto. An aperture 28 entering solenoid cavity 27 serves as a cavity exhaust for solenoid 11 and could be either open to atmosphere as identified in FIG. 1-*a* or it can be piped to a reservoir if used with hydraulic fluids under pressure which fluids have to be returned to a reservoir (not shown) for subsequently pressurization and return via supply port 2 as a pressurized working fluid. A similar aperture 29 serves as a cavity exhaust for the solenoid operator 9 while communicating with a solenoid cavity 31. Solenoid plungers 32 and 33 when disposed generally in an operating relationship at cone end faces 24 and 26 respectively to cover exits 34 and 35 of the internal pilot port 21 of stem 6 being selectively movable can be shifted from plug cone end faces 24 and 26 to close solenoid exhausts 28 and 29 in cavities 27 and 31 by having one of the plungers unseat one of the exits at the end faces when the solenoid becomes energized electrically, and when it is desired to have a position change of the stem from that shown in FIG. 1-*a* to that of FIG. 1-*b*. in order to reroute the fluid flow through the housing bore 7.

Since each of the plungers is held over its respective pilot port exit by a plunger spring 36 or 37 maintaining the plungers substantially axial to the stem, they can easily be moved from their normally closed position over their respective face ends inside solenoid cavities to an open position spaced from each end face of plug cone defining a fluid cavity therebetween and a closed position in blocking engagement with the pilot port at the end face. When the solenoid plunger is moved axially it closes solenoid cavity exhaust and opens pilot port exit for fluid flow through stem aperture 25 into the cavity for pressurization of end face exposed thereto with resultant stem shift. Because of the surface area differential built into the stem having larger surface area at each end face than the surface area at the conical side of the tapered plug cone, there will always be a larger end force in terms of an end thrust that acts over the end face of the plug cone exposed to the solenoid cavity under the pressure of the working fluid when the solenoid cavity is in a closed position, with force unbalance large enough to urge instantaeous position change of the stem from a first to a second position, and maintained in that second position automatically by the pressure of the fluid over the conical surface of the plug cone even when the solenoid cavity becomes exhausted and the plunger is moved into the normally closed position shutting off internal pilot port that was feeding solenoid fluid cavity before. In turn, we can operate this valve by means of momentarily energizing solenoid to shift the stem at an instance we contacted the solenoid leads 38 through which electric current flows. At the end of momentary contact the solenoid is deenergized and the position of stem is maintained fixed by the described action of the fluid pressure of the conical surface of the tapered plug cones 29-*a* and 29-*b* respectively. Because of such a momentary action that provides means of shifting valve stem 6 from one position to another position with little effort by the solenoid electrically, which essentially is disconnected for the most part, and due to subsequent position maintenance by pressure force over the valving member of the valve, the valves so designed are called "Momentary Contact" valves, a term known in the fluid power art. It should be noted however that the existing momentary contact valves are quite complicated, large, unreliable because of inability to stay put in one of positions stem must assume, employ springs because of necessity to help maintain such position, and are therefore quite expensive, bulky and indeed subject to improvements. The momentary contact valve of this invention eliminates all of the shortcommings mentioned above and provides a valve which utilizes fluid dynamics and pressure effect over areas exposed thereto. As seen from the drawings, the stem 6 does provide larger diameter end faces 24 and 26 of the tapered plug cone 29-*a* and 29-*b* respectively as compared with conical surface area opposite the end face each plug cone entails. This area difference can be deduced easily by noting that between the opposing tapered plug cones there is a central stem section 22 of a diameter that has to be substracted when calculating differential areas exposed to the working fluid for shifting and for maintaining stem 6 in one of positions within the housing bore 7.

It is further to note that when one of the tapered plug cones is seated inside its mating conical valve seats, it not only seals but also conforms to seat configuration by distributing valve member load over the whole seat surface of mating parts, while the other of the tapered plug cones is unseated and a distance away from the seat to permit fluid flow through the valve and to maintain valve open due to the pressure force action over the conical surface of such tapered plug until the solenoid is energized to shift the stem for position change and subseqent holding valve in that new position fixed for as long as desired, as discussed while discribing FIG. 1-*a*. Solenoid cavities 27 and 31 of the solenoid operators 11 and 9 respectfully are always at low pressure, either open to atmosphere or piped for fluid returned to a reservoir, as discussed while describing FIG. 1-*a*.

FIG. 1-*b* identifying valve components identical to those of FIG. 1-*a* shows stem 6 with position change wherein port 4 is blocked and port 3 is communicating with port 2 via annuluses 5 and 39 with full pressure force action over the conical surface of tapered plug cone 29-*a* holding the opposite plug cone 29-*b* seated inside its mating conical valve seat 17-*b*.

It is to note here that each of the tapered plug cones must be made so as to insure contact seal between the mating conical valve seat and the tapered plug cone when seated therein during the position change, otherwise valve would not function. For this purpose alone the drawings FIG. 1-*a* and FIG. 1-*b* as well as FIGS. 2-*a* and 2-*b* show seals inside appropriate grooves provided in the tapered plug cones. Seal 40 and 41 serve larger diameter end of the plug cone 29-*a* and 29-*b* respectively and a set of seals 42 and 43 serve smaller diameter of the conical surface of the tapered plug cones 29-*a* and 29-*b* respectively. Consequently, when one of the tapered plug cones is seated inside its mating conical valve seat and the other is unseated, the pressure would act on both the smaller diameter seal at one stem end and larger diameter seal at the other stem end. Obviously the pressure force over the larger diameter unseated seal will be larger than the force over the smaller diameter seated seal and the result will be such that the seated tapered plug cone will always maintain seated due to this pressure unbalance, and the valve once open will stay open by virtue of the larger pressure force at the larger seal. Now, when the solenoid becomes energized, the pressure over the plug end face of any of the stem ends will exert considerably larger end force because such end face will have largest surface area as compared with the surface areas the differential surfaces of the seals have provided before. The stem will therefore shift from one of the positions to another of said positiions with ease because of the pressure magnitude over the end face of the tapered plug cone. Subsequently the solenoid can be vented by exhausting solenoid cavities and the stem position will stay put due to the described pressure effect over the conical surface of the unseated tapered plug cone. Consequently, fluid dynamics in lieu of springs help operate this valve.

It is further to note that the ports 3 and 4 are shown to have drilled and taped openings as normally accepted when fluid flow ports are provided. A specific drill of desired size always precedes a tap in making such holes for 3-way valves. It will be shown that this 3-way valve can easily be converted into a 4-way valve by simple double drilling holes only, as illustrated in FIGS. 2-a and 2-b.

FIG. 2-a is a cut out of the valve shown in FIG. 1-a identifying first closed position blocking fluid communication from inlet port 2 to a first fluid receiver port 3, except the port 3 is now double drilled at the bottom of the hole. It can be seen that port 3 is now a flat bottom hole 3-a having hole 45 of smaller size drilled to exit into the conical valve seat adjacent larger diameter 16 also receives another smaller size hole 46 to exit into the straight section 18 of bore 7. The hole 46 in effect communicating with the solenoid cavity 31 having exhaust 29 in FIG. 2-a is shown exhausting working fluid therethrough from receiver port 3 when the tapered plug cone 29-a is seated inside its mating conical valve 17-a a blocking fluid communication between ports 2 and 3 while port 4 is open for fluid communication between ports 2 and 4 simultaneously. This type of provision indeed is a vary simple means for converting a 3-way valve into a 4-way valve at practically no cost, and as such unattainable by other designs of the existing state of the art. It should be noted that the conversion to a four-way valve does not necessarily require double drilling. Only having hole 46 would suffice because the function of the four way valve would not be impaired if hole 45 were omitted. Hole 45 however may be considered beneficial to have because when stem position changes, both holes 45 and 46 are in communication with annulus 39 for a faster supply of the fluid as shown in FIG. 2-b which identifies valve condition identical to that shown in FIG. 1-b allowing fluid communication from inlet port 2 to a first fluid receiver port 3 while blocking second receiver port 4 from receiving pressurized fluid from port 2 and instead allowing port 4 to exhaust identically as shown in FIG. 2-a when port 4 is double drilled, exposing one of the holes to the solenoid cavity 27 having exhaust 28 open and the stem 6 in the position of FIG. 1-b. Holes 45 and 46 inside blind port 3-a receive considerable more flow from port 2 than if only hole 45 were used for this 4-way valve of the present invention. FIG. 2-b identifies also more clearly smaller diameter 15 and larger diameter 16 of the conical valve seat 17-a which is identical to the valve seat 17-a shown in FIG. 2-a. Also more clearly is shown pilot port exit 34 covered by solenoid plunger 32 as well as larger seal 40 and smaller seal 42 inside tapered plug cone 29-a similarly to that shown in FIG. 2-a. To note is the fact that the solenoid spring 36 of FIG. 2-a is less compressed than in FIG. 2-b because of the position change of the stem 6.

In all respects valve 1 operates in the same manner as the valves disclosed in the FIGS. 2-a to 2-b embodiments.

What is claimed is:

1. A momentary contact valve for selectively porting pressurized fluid from a source to a receiver comprising:

an elongated valve housing having first and second ends interconnected by a bore extending therethrough including a pair of inverted tapered valve seats comprising a part thereof located substantially midway therein with open receiver ends at each opposite housing bore end adaptable to receive solenoid operators, first port in said housing adaptable to be connected to a supply source entering said bore perpendicularly between said tapered valve seats for supply of the pressurized working fluid therein, second port in said housing adaptable to be connected to a first receiver entering said bore perpendicularly adjacent first tapered valve seat, third port in said housing adaptable to be connected to a second receiver entering said bore perpendicularly adjacent second tapered valve seat, valve means in said housing shiftable from a first position blocking fluid communication between said first and second ports while allowing fluid flow between said first and third ports to a second position allowing fluid flow between said first and second ports while blocking fluid communication between said first and third ports, a pair of diametrically opposite electric solenoid operators disposed inside said housing open receiver ends in an axial alignment with and on opposite sides of said valve means in an operable relationship therewith including means for maintaining said valve means in one of said positions and means for shifting said valve means from said first to second positions and vice versa when one of said solenoids is momentarily energized, means for substantially pressure forcing said valve means in one of said positions, including fluid operable means wherein said valve means include an internally piloted movable stem assembly in an axial alignment with said solenoids, having a reduced size center portion interconnecting two larger size valve members that provide opposing larger diameter outward end faces including larger size seals adjacent said end faces and two smaller size inward seals at said reduced size interconnection adjacent said center portion thereof, said outward end faces having large surface area at each stem end, said inward seals having smallest surface area of said valve members and said diametral difference between said larger and smaller diameter seals providing a differential area surface, said surface when exposed to pressure exerting end forces of different magnitude for shifting said valve means into said different directions when desired and for maintaining said valve means in at least one of said positions by a pressure force unbalance the fluid exerts on said valve means, said internal pilot of said stem assembly including a flow passage continuously communicating with said first fluid port inside said housing bore by way of a cross passage provided therein, said pilot passage exiting centrally at each of said end faces of said valve members into a solenoid cavity at solenoid open end opposite said solenoid exhaust apertures at each housing end, said solenoid operator cavities further including a spring loaded plungers axially movable therein between said end faces of said stem and a seat of said solenoid exhaust apertures in a dimensionally changing axial relationship which varies with the position said stem assembly assumes axially inside said valve housing bore during valve operation when one of said solenoid operators is energized electrically, said solenoid plungers thereby selectively moving between an open position spaced from said end faces of said valve members and defining a fluid cavity therebetwween and a closed position in blocking engagement with said end faces of said valve members while allowing said fluid cavity into atmospheric exhaust via said solenoid exhaust apertures, wherein when one of said solenoid operators is momentarily energized said plunger thereof being at a given axial distance between said end face of adjacent valve member and said solenoid exhaust seat is moved into said open position until said solenoid exhaust aperture is closed by said plunger and said solenoid cavity is pressurized by fluid exiting said pilot passage forcing said stem assembly to shift forward thereby increasing the axial distance between said plunger and said end face with resultant change in said axial relationship therein, and when said operator is de-energized, said plunger returns to said closed position over said end face by the spring action dictating utilization of springs that can tolerate said axial distance change.

2. A Valve as in claim 1 wherein said stem assembly includes a first and a second valve members with said differential area surfaces adjacent said first and second ends of said valve housing respectively, said fluid operable means and fluid action maintain said valve means in said first position by the fluid action exerting said pressure force on said differential area surface of said second valve member pressure forcing said first valve member to stay inside a first valve seat with said inward seal exposed to fluid adjacent said first housing end with said smallest end force at one end while at said second housing end said second valve member exposing said differential area surface with substantially larger end force available as a first pressure unbalance said valve experiences in a first direction of pressure, and when said solenoid operator inside said second housing end adjacent said second valve member is momentarily energized electrically, said fluid operable means and fluid action changes exerting largest pressure force on said outward end face of said second valve member in a second direction of pressure opposite said first direction of pressure creating a second pressure unbalance in said valve means urging shifting of said stem assembly from said first to second positions for redirection of fluid flow through the valve and for subsequent maintaining of said valve means in said second position by the fluid action exerting pressure force on said differential area surface of said first valve member, pressure forcing said second valve member to stay inside a second valve seat with said inward seal exposed to fluid adjacent said second housing end with said smallest end force at one end while at the first housing end said first valve member exposing said differential area surface with substantially larger end force available as a first pressure unbalance said valve experiences in a second direction of pressure without the influence of said second pressure unbalance imposed momentarily to said second valve member for said shifting of said stem assembly therein and vice versa, momentarily energizing electrically said first solenoid said stem assembly will shift again to said original first position by said fluid operable means accordingly.

3. A valve as defined in claim 2 wherein said stem with said valve members has a central passage therethrough continuously communicating with said first fluid port inside said housing bore by way of a cross passage provided therein, said central passage exiting each of said end faces into a cavity of said solenoids at each housing end, said central passage exit closed at each end by a first and second solenoid plungers disposed in an operable relationship with said valve members of said stem, said plungers being selectively movable between an open position spaced from said end face defining a fluid cavity therebetween and a closed position in blocking engagement with said passage at said end face wherein when said second plunger is moved into said open position said valve means is shifted from said first to second position in opposite direction by a second unbalance force larger than a first unbalance force that acted in said first direction before said second solenoid operator was energized thereby establishing new flow passage between said first and second ports while blocking said third port and also establishing a new first unbalance force to act in a second direction together with said second unbalance force until said second plunger is moved into a closed position, and wherein when said first plunger is moved into said open position said valve means is shifted back in said first direction regaining said first position blocking communication between said first and second ports while allowing fluid communication between said first and third ports and maintained in this position by said first unbalance force in said first direction after said first plunger is moved to said closed position allowing exhaust of a first fluid cavity, said fluid cavities being normally open to exhaust when said plungers are in normally closed position, said valve members including seals.

4. A valve as in claim 1 wherein said valve members and said mating valve seats are conical tapering on an identical angle defined by said larger and smaller diameters of said seals.

* * * * *